G. ABBOTT, Jr.
APPARATUS FOR COOLING AND DEODORIZING MILK.
No. 182,512. Patented Sept. 26, 1876.
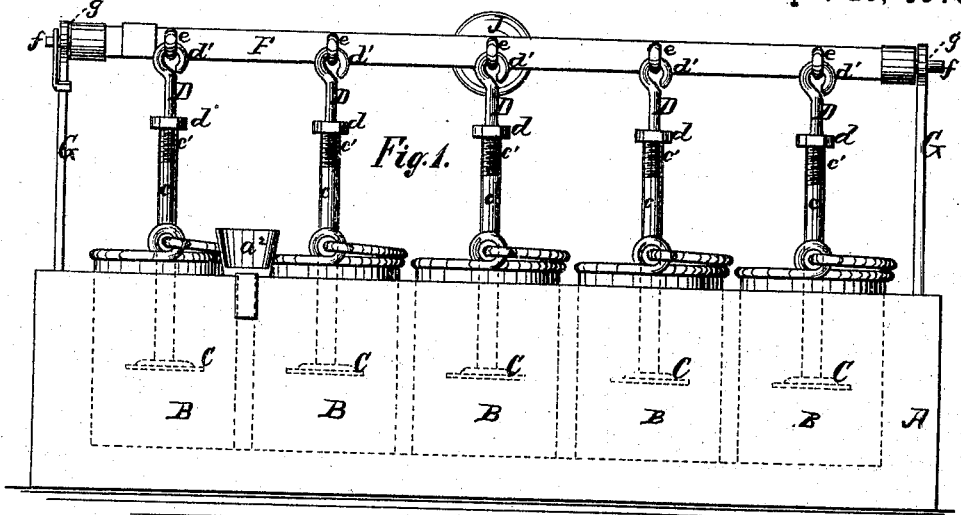
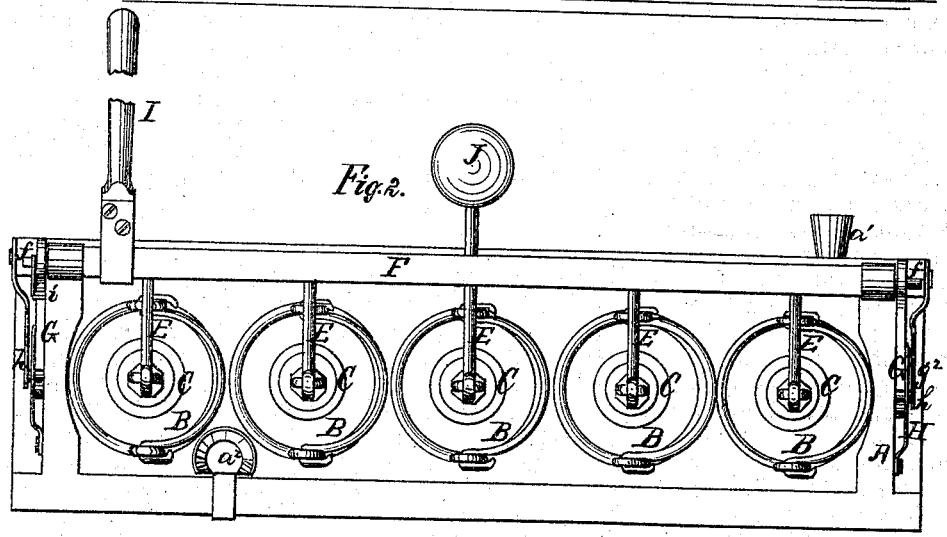
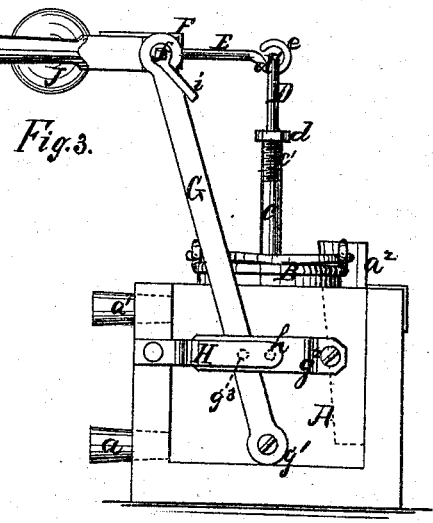
Witnesses:
Theodore Heister
R. S. Clark
Inventor:
George Abbott Jr.
Per Fitch & Fitch
Attys.

UNITED STATES PATENT OFFICE.

GEORGE ABBOTT, JR., OF SALEM, NEW JERSEY.

IMPROVEMENT IN APPARATUS FOR COOLING AND DEODORIZING MILK.

Specification forming part of Letters Patent No. 182,512, dated September 26, 1876; application filed August 25, 1876.

*To all whom it may concern:*

Be it known that I, GEORGE ABBOTT, Jr., of Salem, county of Salem, in the State of New Jersey, have invented an Apparatus for Cooling and Deodorizing Milk, of which the following is a full, clear, and exact description, reference being had to the accompanying drawings, forming part of this specification.

My invention relates to a process for cooling and deodorizing milk fresh from the cow by placing the milk in deep vessels, immersed in running or constantly-renewed cold water, and agitating or stirring the milk in such a manner as to cause the milk contained in the vessel to be continually and in successive portions brought against or in contact with the walls of the said vessel; and the apparatus by which I carry out my process consists in a trough suitably constructed, as hereinafter described, to permit cold water to be constantly passed into and out of it, together with a series of vessels adapted to be immersed in said trough, and a series of detachable dashers, one of which is arranged to depend into one of each of said vessels, and to be given a perpendicular or lifting movement therein by means of arms, to which said dashers are linked, said arms being fixed in an oscillating beam extending the length of the trough, and so adjustable by means of its hinged or pivoted supports that it may be arranged to carry the arms upon either or both sides of said beam, all as hereinafter particularly set forth and described.

Figure 1 is a side elevation of the apparatus which I employ to carry out my process. Fig. 2 is a plan of the same; and Fig. 3 is an end elevation of the same.

In carrying out my process I proceed as follows: Either above or below the surface of the ground I arrange a trough or compartment, A. If a spring of cold water can be conveniently utilized, I place this trough below the ground and permit the water of the spring to enter the trough at $a$ near the bottom, and to overflow and be conducted away through an opening, $a^1$, near the top at the opposite end of the trough. If water has to be pumped or forced into the trough I employ a funnel, $a^2$, which is hung upon the interior of the trough, and conducts the entering water to the bottom of the trough. In case the latter mode is adopted I prefer to allow the trough to be above the surface of the ground, as it can then be more readily emptied and cleansed. I thus, by the arrangement described, secure a constant circulation through the compartment of cold water, which is continually renewed.

The milk, on being drawn from the cow, is poured from the milking-pail into one of the series of vessels shown at B. These vessels should be deep, but of a convenient size to permit their being carried to and from the dairy-yard. These vessels, when thus filled with the warm fresh milk, are immersed in the water contained in the trough A, as shown in the drawings. Now, by means of dashers C, which are carried by rods $c$, and which have a perpendicular reciprocating motion within the vessels B, I agitate or stir the milk, the dasher or plunger passing through the milk with a perpendicular or lifting motion, and causing the milk continually and in successive quantities to be carried to the surface to give off its gases and thus be deodorized, and in like manner to be brought against or in contact with the bottom and sides of the vessels B, and thus be affected by the temperature of water surrounding the vessels, and consequently be reduced in temperature or cooled. Milk thus treated is quickly and conveniently prepared to be kept for market or transportation, while at the same time it readily gives up its cream, as is desirable in a dairy. It is freed from all noxious gases, and may be kept sweet longer than milk cooled in the ordinary way.

The rods $c$ carrying the dashers C have a thread turned upon their upper end at $c'$, whereby they are detachably joined by the nuts $d$ to the links D, and may thus be readily removed and cleansed. The links D are furnished with eyes $d'$, by which they are hinged to the eyes $e$ of the arms E. In the form of apparatus shown in the drawings these arms E extend laterally from one side of a beam, F, which beam is arranged to have an oscillating motion on gudgeons $f$ on its ends, which enter bearings $g$ in the upper ends of the uprights or supports G. The said supports are pivoted upon the trough A at $g^1$, and are held and guided by straps or braceways $g^2$ fixed on the ends of the said trough. By this means the uprights G are inclined to either side of the trough, and the beam F thus carried away from the line of the vessels B, so that the arms E will suspend the dashers C in the center of the vessels. The uprights are held in position by pins $h$ set on spring-holders H, which pins pass through an opening in the braces $g^2$. The beam is oscillated by an arm or lever, I, a suitable weight, J, being provided on the side of the beam opposite to the arms E to equalize the stroke, and the dashers are thus given a perpendicular reciprocating motion in the vessels B, while a stop-catch, $i$, upon the end of the beam, and made adjustable thereon, limits the lengths of the stroke of the dashers in the vessels by contact with the edge of the uprights G. The dashers may thus be operated from either side of the beam, as desired, by swinging the uprights to the other side of the trough, and reversing the beam and its arms. If it is desired, another series of vessels may be immersed in a wider trough, and arms be arranged upon both sides of the beam carrying dashers, as described. In such case, the supports G should be brought to a perpendicular position, where they may be held by the pins $h$ passing through the braces $g^2$ and into and through an opening, $g^3$, in the supports. The dashers will then depend from the arms on either side of the beam into the vessels ranged in the trough below.

What I claim as my invention, and desire to secure by Letters Patent, is—

The apparatus herein described, consisting of the water-trough A, the immersed milk-vessels B, dashers C, on rods $c$ hung on arms E by links D, the oscillating-beam F with its pivoted supports G, the braces $g^2$, and pins $h$, and the hand-lever I, all arranged to operate together as described, and for the purpose specified.

GEO. ABBOTT, JR.

Witnesses:
JNO. P. MOORE,
WILLIAM T. HILLIARD.